US012793335B2

(12) United States Patent
Fieldman

(10) Patent No.: US 12,793,335 B2
(45) Date of Patent: Nov. 10, 2026

(54) CHARACTER AND TEXT RECOGNITION IN EXTENDED REALITY ENVIRONMENTS

(71) Applicant: VR-EDU, Inc., Gainesville, FL (US)

(72) Inventor: Ethan Fieldman, Gainesville, FL (US)

(73) Assignee: CURIOXR, INC., Gainesville, FL (US)

( * ) Notice: Subject to any disclaimer, the term of this patent is extended or adjusted under 35 U.S.C. 154(b) by 135 days.

(21) Appl. No.: 18/766,626

(22) Filed: Jul. 8, 2024

(65) Prior Publication Data

US 2024/0362861 A1 Oct. 31, 2024

Related U.S. Application Data

(63) Continuation of application No. 18/462,302, filed on Sep. 6, 2023, now abandoned.

(60) Provisional application No. 63/404,452, filed on Sep. 7, 2022.

(51) Int. Cl.

| | |
|---|---|
| ***G06T 17/00*** | (2006.01) |
| ***G06T 7/62*** | (2017.01) |
| ***G06T 7/90*** | (2017.01) |

(52) U.S. Cl.

CPC ................ *G06T 17/00* (2013.01); *G06T 7/62* (2017.01); *G06T 7/90* (2017.01)

(58) Field of Classification Search

CPC .. G06T 7/62; G06T 17/00; G06T 7/90; G06V 40/20; G06V 20/20; G06V 30/10; G06F 3/017; G06F 3/011

USPC .......................................................... 345/418

See application file for complete search history.

(56) References Cited

U.S. PATENT DOCUMENTS

| | | | | |
|---|---|---|---|---|
| 9,723,248 | B1 | 8/2017 | Colburn et al. | |
| 10,552,810 | B1 | 2/2020 | Ethington et al. | |
| 11,250,515 | B1 | 2/2022 | Feiteira et al. | |
| 11,531,448 | B1 | 12/2022 | Fieldman | |
| 11,688,151 | B1 | 6/2023 | Fieldman | |
| 2011/0279445 | A1 | 11/2011 | Murphy et al. | |
| 2013/0144482 | A1 | 6/2013 | Tuukkanen | |
| 2014/0298217 | A1 | 10/2014 | Lehtiniemi et al. | |
| 2016/0373647 | A1* | 12/2016 | García Morate | H04N 23/635 |
| 2018/0339720 | A1* | 11/2018 | Singh | G06T 7/001 |
| 2020/0184278 | A1* | 6/2020 | Zadeh | G06N 3/044 |
| 2020/0202128 | A1* | 6/2020 | Liu | G06V 20/35 |
| 2021/0165426 | A1 | 6/2021 | White | |
| 2021/0298868 | A1 | 9/2021 | Rydberg | |
| 2022/0121884 | A1* | 4/2022 | Zadeh | G06N 3/006 |
| 2022/0139056 | A1 | 5/2022 | Fieldman | |

(Continued)

FOREIGN PATENT DOCUMENTS

KR 102480235 B1 12/2022

OTHER PUBLICATIONS

Chen M, AlRegib G, Juang BH. Air-writing recognition—Part I: Modeling and recognition of characters, words, and connecting motions. IEEE Transactions on Human-Machine Systems. Nov. 9, 2015;46(3):403-13.*

(Continued)

*Primary Examiner* — Phu K Nguyen

(74) *Attorney, Agent, or Firm* — Polsinelli PC

(57) ABSTRACT

Systems and methods for aligning and recognizing text in extended reality environments include determining a plane and aligning text on that plane in the extended reality environment to provide for text recognition and interactivity of the recognized text.

19 Claims, 2 Drawing Sheets

(56) References Cited

U.S. PATENT DOCUMENTS

2023/0309795 A1 10/2023 Harad et al.

OTHER PUBLICATIONS

Ouali I, Halima MB. Augmented reality for scene text recognition, visualization and reading to assist visually impaired people. Procedia Computer Science. Jan. 1, 2022;207:158-67.*

Hwang S, Lee J, Kang S. Enabling product recognition and tracking based on text detection for mobile augmented reality. IEEE Access. Sep. 8, 2022;10:98769-82.*

Gan J, Wang W, Lu K. In-air handwritten Chinese text recognition with temporal convolutional recurrent network. Pattern Recognition. Jan. 1, 2020;97:107025.*

Gan J, Wang W. In-air handwritten English word recognition using attention recurrent translator. Neural Computing and Applications. Jul. 1, 2019;31(7):3155-72.*

Tayyab M, Hussain A, Alshara MA, Khan S, Alotaibi RM, Baig AR. Recognition of visual arabic scripting news ticker from broadcast stream. IEEE Access. May 30, 2022;10:59189-204.*

Drobac S, Lindén K. Optical character recognition with neural networks and post-correction with finite state methods. International journal on document analysis and recognition (IJDAR). Dec. 2020;23(4):279-95.*

U.S. Appl. No. 18/116,646, filed Mar. 2, 2023, 218 pages.

U.S. Appl. No. 18/306,800, filed Apr. 25, 2023, 200 pages.

Chicaiza EA, De la Cruz, Andaluz VH. Augmented reality system for training and assistance in the management of industrial equipment and instruments. InAdvances in Visual Computing: 13th International Symposium, ISVC 2018, Las Vegas, NV, USA, Nov. 19-21, 2018, Proceedings 13 2018 (pp. 675-686). Springer Inte.

Romero JA, Quero WD, Sanchez JS, Andaluz VH. Training assistant for industrial processes through augmented reality. InProceedings of the 11th International Conference on Education Technology and Computers Oct. 28, 2019 (pp. 308-315).

Playful Technology, Augmented Reality (AR) tutorial for beginners using Unity 2022, Jun. 27, 2022 Escape Room Tech Puzzles; https://www.youtube.com/watch?v=gpaq5bAjya8.

Isola P, Zhu JY, Zhou T, Efros AA. Image-to-image translation with conditional adversarial networks. InProceedings of the IEEE conference on computer vision and pattern recognition 2017 (pp. 1125-1134).

Qiao T, Zhang J, Xu D, Tao D. Mirrorgan: Learning text-to-image generation by redescription. InProceedings of the IEEE/CVF Conference on Computer Vision and Pattern Recognition 2019 (pp. 1505-1514).

Zhang H, Koh JY, Baldridge J, Lee H, Yang Y. Cross-modal contrastive learning for text-to-image generation. InProceedings of the IEEE/CVF conference on computer vision and pattern recognition 2021 (pp. 833-842).

Yu J, Xu Y, Koh JY, Luong T, Baid G, Wang Z, Vasudevan V, Ku A, Yang Y, Ayan BK, Hutchinson B. Scaling autoregressive models for content-rich text-to-image generation. arXiv preprint arXiv:2206.10789. Jun. 22, 2022;2(3):5.

Busch L, Koch J, Schoepflin D, Schulze M, Schuppstuhl T. Towards Recognition of Human Actions in Collaborative Tasks with Robots: Extending Action Recognition with Tool Recognition Methods. Sensors. 2023;23:5718.

Shilkrot13, Roy, Supreeth Narasimhaswamy, Saif Vazir, and Minh Hoai12. "WorkingHands: A hand-tool assembly dataset for image segmentation and activity mining." (2019).

Kurnaz FC, Hocaoglu B, Yilmaz MK, Sulo I, Kalkan S. Alet (automated labeling of equipment and tools): A dataset for tool detection and human worker safety detection. InComputer Vision-ECCV 2020 Workshops: Glasgow, UK, Aug. 23-28, 2020, Proceedings, Part IV 16 2020 (pp. 371-386). Springer International Publishin.

* cited by examiner

CHARACTER AND TEXT RECOGNITION IN EXTENDED REALITY ENVIRONMENTS

CROSS-REFERENCE TO RELATED APPLICATIONS

This application is a continuation of U.S. patent application Ser. No. 18/462,302, filed Sep. 6, 2023, and titled "SYSTEMS AND METHODS FOR EDUCATING IN VIRTUAL REALITY ENVIRONMENTS," which claims priority to U.S. Provisional Patent Application Ser. No. 63/404,452, filed Sep. 7, 2022, and titled "SYSTEMS AND METHODS FOR EDUCATING IN VIRTUAL REALITY ENVIRONMENTS," all of which are incorporated herein by reference in their entirety.

BACKGROUND OF THE INVENTION

Extended reality (XR) environments, i.e., environments created by immersive technologies that merge physical and virtual worlds, such as augmented reality (AR), virtual reality (VR), and mixed reality (MR) and the like, have grown more realistic and immersive as VR headsets, augmented reality devices and applications, processor speeds, data storage and data transfer technologies have continued to improve. However, unlike conventional physical reality, electronic XR environments present more opportunities for persons to collaborate and share information, including in work and education fields, in ways that are not possible in the physical constraints of the real-world.

One of the challenges to taking advantage of these opportunities is combining two-dimensional (2D) and three-dimensional (3D) displays of virtual objects and information to enable users to see, use, interact, store, and manage collaborative activities, information, other users, and the virtual objects optimally in the XR environment. Another challenge to working and learning in XR environments is adapting a user's real-world physical positions and motions to provide information inputs and corresponding VR experiences and VR views in the virtual reality world, particularly when multiple users occupy a common space in VR and have different viewing angles and perspectives with respect objects displayed in the space in the virtual reality world.

The disclosures of U.S. Patent Publication No. US 2022/0139056, U.S. Pat. Nos. 11,531,448, 11,688,151, U.S. patent application Ser. No. 18/116,646, and U.S. patent application Ser. No. 18/306,800 are incorporated by reference in their entireties.

SUMMARY OF THE INVENTION

Embodiments of the invention address these challenges by providing methods and systems with improved display and functionality for educating users, including scholastic, tutoring, work, and other educational activities, in a XR environment. In embodiments, methods and systems of the invention are implemented through development tools for the Oculus/Meta Quest platform (Oculus Platform SDK or "Oculus SDK") by Oculus VR (Irvine, CA) (parent company Meta). It will be appreciated that the systems and methods, including related displays, user interfaces, controls, and functionalities, disclosed herein may be similarly implemented on other XR platforms with other XR SDKs and software development tools known to XR developers.

DETAILED DESCRIPTION

Figure 1:
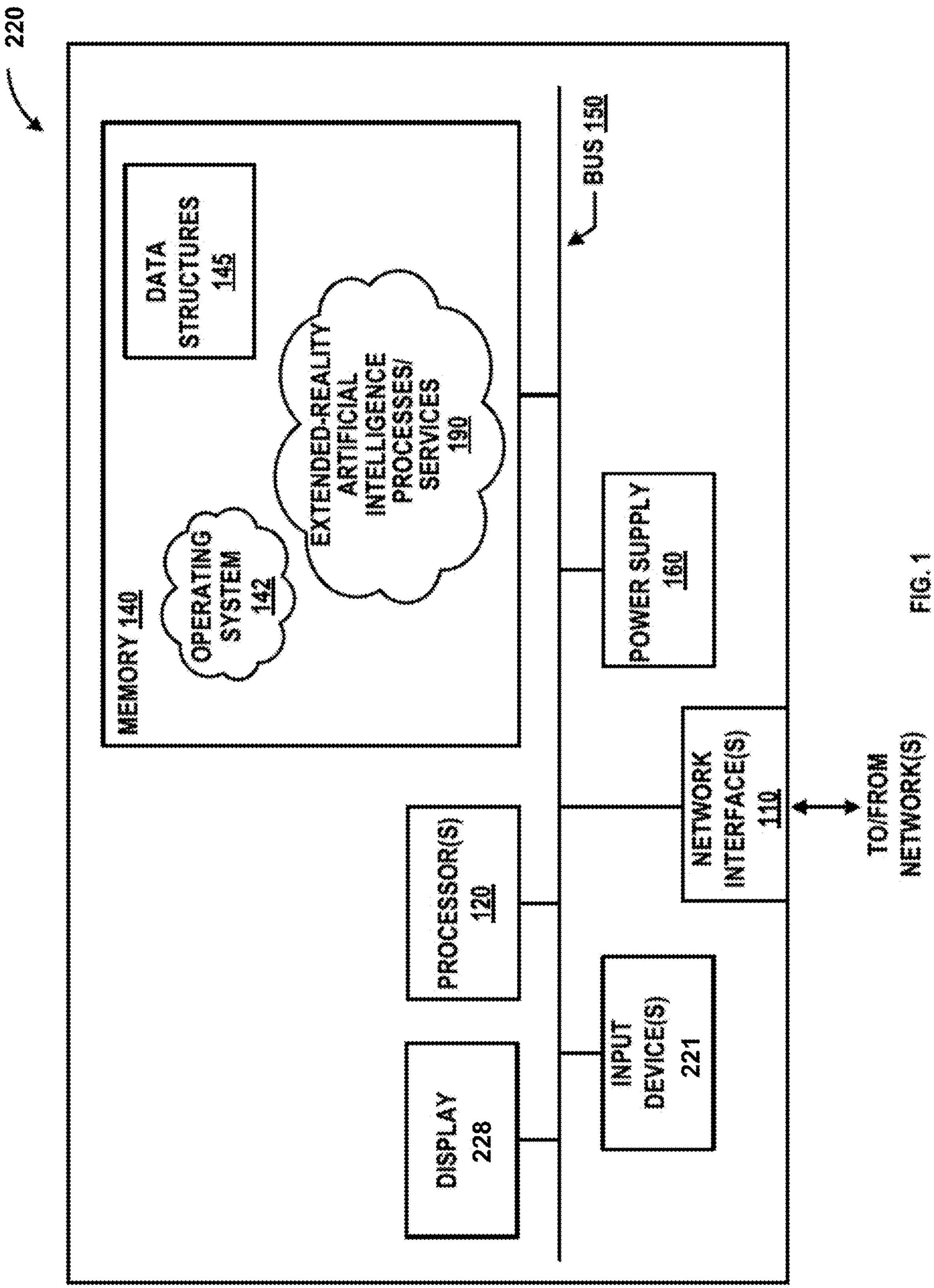
FIG. 1 is a schematic block diagram of XR device in an embodiment of the invention.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In various embodiments, methods and systems of the invention are preferably implemented through development tools for the Oculus/Meta Quest platform (Oculus Platform SDK) by Oculus VR (Irvine, CA) (parent company Meta). It will be appreciated that the systems and methods, including related displays, user interfaces, controls, and functionalities, disclosed herein may be similarly implemented on other VR platforms with other VR SDKs and software development tools known to VR developers.

Computer-Implemented System

FIG. 1 is a schematic block diagram of an example XR device 220, such as wearable XR headset, that may be used with one or more embodiments described herein.

XR device 220 comprises one or more network interfaces 110 (e.g., wired, wireless, PLC, etc.), at least one processor 120, and a memory 140 interconnected by a system bus 150, as well as a power supply 160 (e.g., battery, plug-in adapter, solar power, etc.). XR device 220 can further include a display 228 for display of the XR learning environment, where display 228 can include a virtual reality display of a VR headset. Further, XR device 220 can include input device(s) 221, which can include audio input devices and orientation/inertial measurement devices. For tracking of body parts, such as hands, faces, arms and legs, held physical objects, and the like, input devices include cameras (such as integrated with an XR headset device or external cameras) and/or wearable movement tracking electronic devices, such as electronic gloves, electronic straps and bands, and other electronic wearables. XR devices of the invention may connect to one or more computing systems via wired (e.g., high speed Ethernet connection) or wireless connections (e.g., high speed wireless connections), such that computer processing, particular processing requiring significant processing and power capabilities, can be carried out remotely from the display of the XR device 220 and need not be self-contained on the XR device 220.

Network interface(s) 110 include the mechanical, electrical, and signaling circuitry for communicating data over the communication links coupled to a communication network. Network interfaces 110 are configured to transmit and/or receive data using a variety of different communication protocols. As illustrated, the box representing network interfaces 110 is shown for simplicity, and it is appreciated that such interfaces may represent different types of network connections such as wireless and wired (physical) connections. Network interfaces 110 are shown separately from power supply 160, however it is appreciated that the interfaces that support PLC protocols may communicate through power supply 160 and/or may be an integral component coupled to power supply 160.

Memory 140 includes a plurality of storage locations that are addressable by processor 120 and network interfaces 110 for storing software programs and data structures associated with the embodiments described herein. In some embodiments, XR device 220 may have limited memory or no memory (e.g., no memory for storage other than for programs/processes operating on the device and associated caches). Memory 140 can include instructions executable by the processor 120 that, when executed by the processor 120, cause the processor 120 to implement aspects of the system and the methods outlined herein.

Processor 120 comprises hardware elements or logic adapted to execute the software programs (e.g., instructions) and manipulate data structures 145. An operating system 142, portions of which are typically resident in memory 140 and executed by the processor, functionally organizes XR device 220 by, inter alia, invoking operations in support of software processes and/or services executing on the device. These software processes and/or services may include Extended Reality (XR) artificial intelligence processes/services 190, which can include methods and/or implementations of standalone processes and/or modules providing functionality described herein. While XR artificial intelligence (AI) processes/services 190 are illustrated in centralized memory 140, alternative embodiments provide for the processes/services to be operated as programmed software within the network interfaces 110, such as a component of a MAC layer, and/or as part of a distributed computing network environment. It will be appreciated that AI processes include the combination of sets of data with processing algorithms enable the AI process to learn from patterns and features in the data being analyzed, problem being solved, or answer being retrieved. Preferably each time an AI process processes data, it tests and measures its own performance and develops additional expertise for the requested task.

In various embodiments AI processes/services 190 may create requested digital object images via image generating AI system, such as Dall-E or Dall-E 2 (see https://openai.com/product/dall-e-2 incorporated herein by preference) or other similar image generation systems and other synthetic media. In other embodiments, an AI process/service 190 might retrieve a requested digital object image from one or more local databases, centralized databases, cloud-based databases such as Internet databases, or decentralized databases. Some further examples of connected AI processes may include ChatGPT™ by OpenAI™ and Wolfram™ tools for AI and the like that the XR system of the invention can use for text and speech-based outputs.

Figure 2:
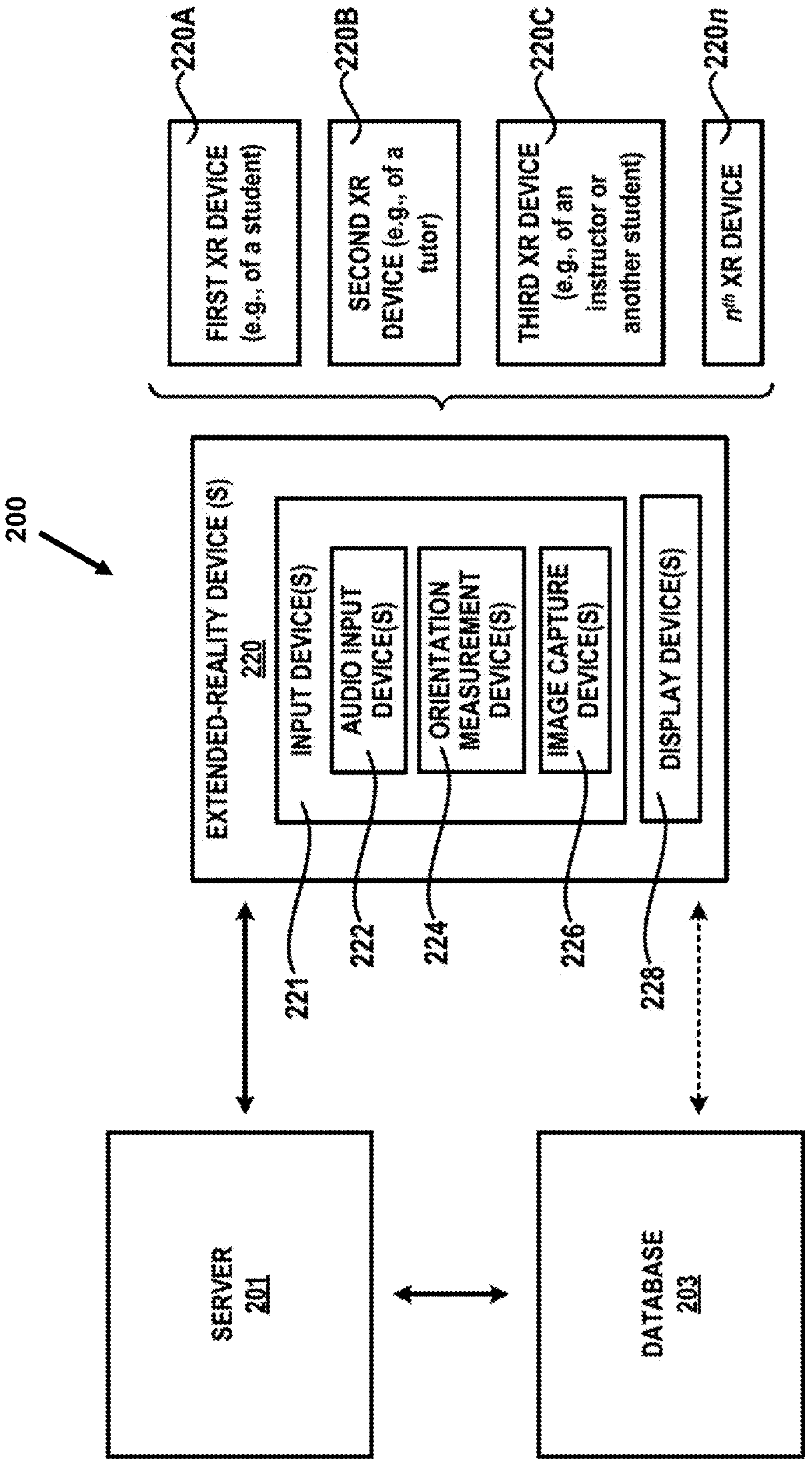
FIG. 2 is a schematic block diagram of an XR system platform in an embodiment of the invention.

Referring to FIG. 2, an XR system (hereinafter, "system 200") for implementation of the XR learning environment, including an XR server 201 accessible by a plurality of XR devices 220 (e.g., a first XR device 220A of a first user such as a student, a second XR device 220B of a second user such as a tutor, a third XR device 220C of a third user such as an instructor . . . an nth XR device 220*n* belonging to another user, etc.) and another suitable computing devices with which a user can participate in the XR learning environment. The system includes a database 203 communicatively coupled to the XR server 201.

XR devices 220 includes components as input devices 221, such as audio input devices 222, orientation measurement devices 224, image capture devices 226 and XR display devices 228, such as headset display devices.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions.

3D OCR

A XR computing device can be programmed to perform 3-dimensional optical character recognition (OCR). A software program running on the device determines a plane based on the minimized standard deviation, and then once the plane is determined, the software adjusts pixels (i.e., dots) representing text to the plane on that axis and then artificial intelligence software with OCR capabilities recognizes characters from the text on the plane and the software puts the letters and numbers from the text on the same plane. For example, a user in the XR environment might create angled written text by handwritten activity and that written text becomes angled typewritten text in a selected typewritten font. In another example, text to be recognized (such as handwritten text) may be very close to vertical plane, and the computing device OCR software may use a determined plane for the artificial intelligence OCR function to read the text. On a per symbol, drawing or letter basis the system actively determines what letter or symbol was created. For example, if the user created the letter "a" in 3D space, the system determines what letter was made and would produce a result(s) with an accuracy rating, as well as other information. For example, it might return "a" 99.8%, "o" 0.1%, etc.

The OCR software is also programmed to determine a plane based on 3D positions of each handwritten word, letter, symbol, or drawing. Once the plane is determined, the text, symbols, drawings, and the like, are auto aligned on that plane in 3D space. This auto alignment shifts the initial drawn positions into the OCR-calculated alignment positions, but when it comes back to display the text, the OCR software autocorrects basically to provide the software-generated/digital text on a perfectly vertical plane. The user's inputs are translated through the OCR algorithms to auto align, auto place, and adjust positioning and sizing, particularly since a user might have bad handwriting.

A user can further have the ability to use their hands or a controller to adjust the z-axis/pitch of the words if they don't like the presentation of the text and/or characters on the plane, including selecting individual words or characters for adjustment of pitch/angles. In further embodiments, a user can also adjust the sizing of the text with hand or controller inputs, as well as being able to change the yaw and roll of the text in addition to the possibility of adjusting the pitch. The user can also move the text object(s) up/down, left/right and forward/back for six degrees of freedom adjustment in combination with pitch, yaw and roll (on pitch, yaw and/or roll axes). These controls to modify the appearance of text may be provided by gestures (such as pinching to reduce size of selected text) and movement of hands recognized by a VR camera and processed by the programmed VR software to interpret such motion inputs, or by controller inputs, or by voice commands, or also by selections from a user interface presented to the user in the XR environment, including presentation of menus, push buttons, toggle buttons, sliders, rotation icons, and the like, as such menu and control interface triggers will appreciated from 2-D word processing software applications such as Microsoft Word, Google Docs and the like (but programmed for display and use in a 3D/XR environment).

Writing and Virtual Tool and Object Creation in VR

Writing in VR can be improved with implementation of writing instrument recognition or choice and providing corresponding thickness, color, and texture of the writing result to the desired writing tool. In an embodiment of the invention, 3D scans are made of markers (like Expo™, Crayola™ and the like), pens (like Sharpie™ or Pilot™ and the like), pencils (colored, mechanical, traditional and the like), and other writing instruments, and cameras on XR computing device (such as a headset) are in working communication with optical recognition software so that when a word or phrase such as 'expo' or 'sharpie' or 'pilot gel' is recognized through the camera by a user that picks up and is holding the desired instrument, which also can trigger recognition of type of instrument, including brand, kind, size, color, writing thickness and the like. In some embodiments, the recognized parameters are matched against the scans from the database communicatively coupled to the XR device or headset and the corresponding writing instrument with corresponding writing features is virtually displayer for use by the user, such as in the user's virtual hand, in the XR environment.

In some embodiments, it may be most efficient to simply recognize the text 'sharpie' or 'expo' and then detect the color of the cap (because that is where the color is on markers and the user does not need to remove the cap to choose a writing tool and write in VR) and the writing tool software also recognizes the shape of the writing tool and matches to the database, and then provides the corresponding tool in the XR environment.

In another optical recognition example, the camera and recognition software may see various names of companies or products or the shape of the physical object in your hand, such as a mechanical pencil or a regular pencil, the "#2" might recognize on the pencil, and the recognition software knows a pencil is being used. The recognition software then searches the database and finds a number 2 pencil and renders a virtual reality version of a #2 pencil in a user's hand in the XR environment.

In other embodiments, the writing instrument and corresponding writing characteristic may be identified by the VR system through reading an abstract unique identifier, such as a QR code, bar code (such as from an instrument package), and the like. In other embodiments, a tracker, tag (such as RFID tag) or chip (such as RFID chip) that sends an information signal to identify the device can be placed on the writing device and detected by a corresponding detector connected to the VR system that reads the signal from the tracker, tag or chip and then displays the detected writing device for use by a user in the XR environment—typically in the user's writing hand.

In other embodiments, speech recognition software may be used so that a user could request a specific writing instrument, color, thickness, and like writing tool features, with the user's voice, for example, by saying 'writing tool expo marker red' and a red Expo marker is provided to user in the XR environment. In other embodiments, other tools and instrument might also be requested such as 'give me scissors' and then scissors are provided the user in the XR environment. In some embodiments, an indicator word/phrase can signal to software actively listening for commands that the user is to be provided a writing instrument or other tools, such as "TOOL REQUEST" followed by the specific request tool such as "scissors" or "Sharpie fine tip pen in black". The specific indicator phrase "TOOL REQUEST" is identified by the speech recognition software as a command request rather than normal speech and the specific request is then identified as following the indicator phrase.

Broadly, in speech recognition embodiments the user's voice is converted to text and text is compared to a list of known text commands and tools to the database of tools and writing instructions and the like to find the tool object to be provided in the XR environment.

Although embodiments of the invention have been described for displaying virtual versions of drawings or writing instruments recognized from a user's real world environment, it will be appreciated that other objects or tools held by a user in the real world can be similarly recognized and displayed in the XR environment by the XR system communicating with a database from which the objects or tools are recognized, including from image matching, keywords, optical character recognition, speech recognition and the like.

In one aspect of the invention, a method includes displaying a tool or object in an extended reality environment that comprise displaying on a display of an extended reality device of a user an extended reality environment, capturing an image of at least a portion of a tool physically held by the user in a real world environment with a camera of the extended reality device, determining a type of the tool or object from among a variety of tool or object types stored in a database communicatively coupled to the extended reality device based on the image of at least a portion of the tool captured by the camera; and displaying a virtual version of the tool or object physically held by the user in the real world environment in a virtual hand of the user in the extended reality environment based on the type of the tool or the object determined.

In embodiments, the type of tool or object includes one or more of brand, color, size, or shape, and the like. In further embodiments the tool or object is a writing or drawing instrument, and type of instrument may further include writing thickness size or writing tip characteristics.

In embodiments, the method for determining a tool or object type includes comparing the image of at least a portion of the tool or object with a plurality of tool and/or object images stored in the database to determine the type of tool or object.

In embodiments, a system of the invention, includes a processor in communication with a memory, the memory including instructions executable by the processor to: display on a display of an extended reality device of a user an extended reality environment; capture an image of at least a portion of a tool physically held by the user in a real world environment; determine a type of the tool from among a variety of tool types stored in a database communicatively coupled to the extended reality device based on the image of at least a portion of the tool, and display a virtual version of the tool physically held by the user in the real world environment in a virtual hand of the user in the extended reality environment based on the type of the tool determined from among the variety of tool types stored in the database.

In one embodiment of a system, the tool is a writing or drawing instrument.

In further embodiments, the image of at least a portion of the tool or writing or drawing instrument includes optically recognizable text, such as a brand.

In further embodiments, the image of at least a portion of the writing or drawing instrument or of a tool includes at least one of a size, shape or color of the instrument or tool.

In some embodiment, a system of the invention includes, a processor in communication with a memory, the memory including instructions executable by the processor to: display on a display of an extended reality device of a user an extended reality environment, capture an image of at least a portion of an object physically held or worn by the user in a real world environment; determine a type of the object from among a variety of object types stored in a database communicatively coupled to the extended reality device based on the image of at least a portion of object, and display a virtual version of the object physically held or worn by the user in the real world environment as being respectively virtually held or worn by the user in the extended reality environment based on the type of the object determined from among the variety of object types stored in the database.

In further embodiments, the image of at least a portion of the object includes optically recognizable text, such as a brand.

In other embodiments, the image of at least a portion of the object includes at least one of a size, shape, or color of the object.

Writing on 3D Objects

Writing in 3D is recognized by one or more cameras of a virtual reality computing device (such as a headset) through detection of motion of user's hands relative to a 3D object in the XR environment during a writing activity and in conjunction with writing/motion recognition software running on the XR computing device. For example, in one embodiment the VR system is programmed to detect a writing motion or hand pose, and that triggers to the system to begin writing detection. The user can enter the writing activity through gesture, hand pose, button interaction, voice commands, or prompt from the system such as sound queues indicating to the user the motions or inputs needed for writing on a VR 3D object.

In one embodiment a user can unroll a 2D (which is still a 3D object but has a 2D writing surface displayed and used in the XR environment) board generally wherever the user wants and position the board as a writing plane at any desired angle. When a user writes in the XR environment or draws the recognition software and camera detect the user's movement and then also autocorrect for the margin of error that a will ultimately results when a user moves their hand, finger, or writing tool in front and behind the plane of the board since it is impossible to precisely write on only the plane. The recognition software is programmed so that the writing plane is determined to be at a certain distance and as the camera and software detects movement of the intended writing "tip" of the user, there is certain margin of error "zone" in front of and behind the writing plane that assumes that the user's writing is intended for the writing plane if the writing "tip" is within that writing detection range of the assigned writing plane distance. For example, the VR software can be programmed to record the position of a 3D box as well as its faces and corners (referred to Bounding Box). The Bounding Box is placed surrounding the writing plane. The VR software application is programmed to track the movement of the "tip" of a VR writing instrument and compare it to the area the bounding box encapsulates in 3D space. While the "tip" remains in the bounding box, it is considered, and possibly visually adjusted, to be positioned on the writing plane.

In one embodiment of the described 2D writing board surface (which is still a 3D object in VR as mentioned previously), a 2D smart board may be provided that is initially translucent so that a user can ONLY place it when the user has a marker in their hand and ONLY when the user gets close to the board does the translucent board show up as opaque (or generally opaque so that it is clear that the user can now write on the board). The 2D board surface may be a finite size board or it could be an infinite plane, but it will be appreciated that writing on a plane when a user is in 3D, i.e., in a XR environment, is an improvement to current 3D writing in VR that includes the z-axis and does not replicate a true physical dry erase board like a writing plane in 2D within the XR environment can provide.

In other embodiments, a user can write on any object in a virtual reality environment, such as a molecule model or a 3D cube or another object with a writing surface available. Similar to the writing plane described, camera and writing recognition software determines where the surface of the object is positioned in the XR environment and then permits writing and drawing on the object's surface by displaying virtual ink in the XR environment on the object based on the user's writing motion within the detectable writing zone of the object's surface. The writing is then displayed on the surface, including the option to be persistently displayed on remain on the object's surface.

Hotspot Areas of a VR Tablet and Performance of Certain Actions that can Only be Performed Relative to that Hotspot In embodiments, a user may interact with a virtual tablet in a XR environment, such as virtual iPad-type tablet provided to a user for interaction with and control of the XR environment via the virtual tablet.

Such a VR tablet may have active (hotspot areas of VR tablet) and non-active areas so that a user can only perform interaction and certain control inputs that are programmed in the VR software for the XR environment relative to the hotspot area on the VR tablet. Non-active areas of the VR tablet are provided as non-active and generally do not result in any interactivity when the user interacts with the non-active area of the VR tablet.

As an example, a VR tablet may include a visual screen showing a flippable and/or sliding switch that enables a user to turn on and dim/increase lighting in a VR room environment. On the tablet, the location of the "active" or hotspot area of switch would detect sliding or flipping actions of the user in such hotspot area and provide the resulting change in lighting of the room based on the interaction. Other areas shown on the VR tablet are non-active and non-responsive to the user so that detection functions of the virtual reality platform software or VR application is focused only the hotspot area of the VR tablet. Areas of the tablet dynamic to the content a user is viewing are sectioned off to be Active or Inactive. A 3D shape or multiple 3D shapes are programmed to encompass the respective Active or Inactive areas and a user's input is compared to the 3D shapes' bounds to determine if the user's input was found in an active hotspot. It will be appreciated that defining and detecting the Active and Inactive areas can be accomplished through software programming known from conventional Physics Engines, Game Engines, and UI (and similar) SDK's.

In further embodiments, a VR system can also track data regarding how users interact with hotspot active areas and non-active areas of a planar interface (like a VR tablet screen) or even hotspot active areas and non-active areas as to objects in the XR environment more generally. Data tracked may include duration of the interaction, number of times interacted, interaction method (for instance, which finger was used), the combination of multiple interactions (chain of interactions leading up to this one), type of object or activity being displayed where interaction occurred, the timestamp of when the interaction took place, the state of the application of or device while interacting, what other points of interest were active at that time, and the like. The data is then gathered, sorted, labeled, and stored. It will be appreciated that the data may then be used to generate reports, used with artificial intelligence (AI) software, make improvements to the VR experience, provide for display of future objects or activities to a user in the XR environment and the like.

In further embodiments when a user interacts with a VR tablet in the XR environment, the VR software/application detecting user interaction is programmed to discern between intentional interactions for a control input or interactivity versus motions of the user that might overlap with the VR tablet screen (or similar visual plane providing an interactive interface like a tablet screen) that are not intended as providing an input interaction with the VR tablet. For example, intentional tapping, swiping, sliding and the like gestures to the tab can be differentiated from one another as well as be differentiated from gestures or motions that are not intended to result in a control input to the VR tablet. The implementation of the invention is similar to touching a smartphone screen in real world, and discerning accidental touches vs multi finger touches and gestures (zooming). Each interaction zone of a tablet in the XR environment would has a preprogrammed response to the list of gestures or actions that the VR tablet is programmed to receive. The VR system is programmed to constantly detect if any actions or gestures are activated. In embodiments, each Gesture or Action can describe the state of the app, input device, or interaction that triggers it to become active.

In some embodiments, artificial intelligence software is provided in conjunction with the VR tablet interface inputs detection software to "learn" the intentions and associated gesture of a particular user, i.e., individualized learning of how a user taps, swipes, slides and conducts like interactive interactions with a tablet (or with other objects in the XR environment) by receiving feedback from the user over repeated interactions that confirm the user's motions and intentions. In other or complementary embodiments, a user may also configure their gesture recognition relative to tablets (or other objects in a XR environment) through initial set-up actions in which user's may provide one or more gesturing motions that the VR gesture recognition software reads and saves for that particular user and compare future user motions to verify a VR gesture (such as tablet swiping or tapping) is carried out by a user. Individual configuration and learning individual gestures are an improvement over a standardized "one size fits all" gesture recognition system since some people don't push all the way when pushing a VR button or screen object on a VR table or otherwise have different depths or gesturing relative to an interactive plane (including a VR tablet screen) or VR object. An initial configuration for each person can personalize such recognition, and real-time learning AI software can learn gestures better and more accurately and quickly carry out desired interactivity results in response to detecting gestures.

Assistive Drawing Plane-Like Tablet Function

In embodiments, a user can define their own plane in a XR environment by making three points in space in the XR environment that define the plane and the VR software will then create the plane for those three points. The VR plane can provide interactive virtual writing or drawing surface similar to or even as a virtual tablet screen. It will be appreciated that predefined gestures, a voice command, a control, or tools interface may be used for the user to indicate to the VR software that a plane is desired, and the user will be inputting the three points for initiating drawing of the plane. A virtual plane in the XR environment could have defined dimensions and/or shape, could be user-defined in size and/or shape or could be an infinite plane on one or more axes in one or more directions. A user can also adjust the pitch, yaw and roll of the plane (on pitch, yaw and/or roll axes) for providing a preferred view and working angle of the virtual plane. The user can also move the plane up/down, left/right and forward/back for six degrees of freedom adjustment in combination with pitch, yaw and roll.

In embodiments, the created "working" VR plane is not necessarily limited to just writing and drawing interactions, but could serve as an interactive tool for countless interactivities of the user with the XR environment, including as a desk or table from which 3D objects and tools are retrieved, used and situated by the user, or to create VR electronic white boards that may be positioned as desired by the user (such as those described in US Pat. Pub. No. US 2022/0139056).

In further embodiments, a user could define that "working zone" or constraint vertices of a VR object (such as a 3D object having a flat surface) be extended into a three-dimensional working polyhedron of various shapes based on the shape of the working zone. The user could indicate, such as by a pulling gesture, that a flat surface shape should be extended as the 3-D polyhedron (e.g., pulling up on a square surface to make a cube). The polyhedron then serves as working space with multiple drawing or writing surfaces. In other embodiment the working interactive polyhedron could have objects retrieved and produced within the polyhedron, like a 3D model of a molecule, or serve as a 3-D text box in which 3-D text may be inserted such as by speech recognition, writing or typing inputs to the XR environment.

Speech-to-Text in 3D and Request Images to be Displayed

In embodiments, speech recognition may be used for a user to more efficiently interact with a XR environment and produce text, drawings, images, videos, objects and the like in the XR environment. A pre-defined and unique key word can be used to signal to speech recognition software running in the XR environment of XR computing device that a user is making a "call", i.e., command indicator, for creation of text, drawing, video, object, or image in the XR environment. For example, a user might say "Get Me" (as an indicator that a request for virtual information to be displayed) and follow that saying with "Text of 'Gettysburg Address'" and text of the Gettysburg Address is displayed in the XR environment. Other examples include "Get Me: Model of Water Molecule" or "Get Me: VR Tablet" and the like. In other embodiments, a gesture, like a hand gesture, finger motion (e.g., pointing to mouth) and the like, could be used to signal the speech recognition software.

Where to Start People in a Room and Relative to a White Board or Other Educational or Displayed Object According to an embodiment of this invention, a main focus area of a classroom in VR can be shifted and moved. For example, a teacher can move the white board around the room as the lesson progresses and user will automatically be positioned relative to having desirable views of the white board. Users who join the room in the 3D environment are also automatically positioned relative to having a desirable view of the white board or current main focus of the classroom. That is, users will be positioned facing and near the whiteboard or object of focus. In some embodiment, a viewing user may not see other users so that their individual viewing experience is optimized without block or distraction of others in the room—although many users can simultaneously view the object of focus. It will be appreciated that users or parts of users that would be blocking another user's point of view can be programmed to turn transparent or disappear so that each viewing user has a preferential view of the object that is the center of focus. In some embodiments, it can appear to each viewing user that they are the only viewer of that object in the room, and they automatically have a center and front undisrupted view that automatically is displayed to each of the viewing users even if there are multiple viewing users at the same time.

In other embodiments, such as a work XR environment, the main focus and user controlling the main focus could be relative to a conference room, lecture space, habitat, or other rooms, spaces and activities that are not limited to classroom environments. In this regard, it will be appreciated that a main focus could be any type of VR life form or inanimate object that a user (or group of users using the object or life form for education, illustration, discussion and the like) would like other users to view and have a focus upon for the activity in that environment.

File Sharing in VR Room

In an embodiment where multiple users are in VR room, like a teacher or tutor with students in a VR classroom, functionality can be provided for a teacher to selectively permit access to certain files, objects and tools being displayed and like information presented in the room to only certain users. For example, only some students in the room might be preferred for access to certain files that teacher would like to share. The teacher could use XR environment tools (like a VR tablet or speech commands and the like) to share only those desired files (or other VR materials) and indicate which users and for how long the access is to be granted (e.g., only while in the room, indefinitely, permanent, and other specified time periods).

In embodiments, the shared file or other VR materials will then be accessible to the authorized users (such as including in their own "My Files"-type folder) for the permitted time period. In some embodiments, the shared materials, such as in the case of files, can be accessible in one or more of the XR environment and via online systems outside of the XR environment.

Unlike in conventional file security environments in the "real world," in embodiments of the invention, objects and files that are present in the room that a user does not have access are automatically via programmed VR software blurred, modified, not displayed or otherwise unreadable or unrecognizable to the user without appropriate access.

VR Tablet Privacy

In some embodiments where users in a XR environment are using a VR tablet (see prior descriptions), multiple users with VR tablets may be in the same VR room and it can be advantageous to permit visibility or no visibility between certain users and other users' tablet. Unlike in the real-world environment, in a XR environment a user can be provided the ability to "call" for a copy or access to see another user's tablet screen in the XR environment. This functionality can be implemented like current and described tools and methods for retrieving objects and materials in a VR room. In some embodiments, another user might not even be in the XR environment, and another user could be permitted access to the out-of-VR user's tablet and associated information that is stored on a cloud server linked to the XR environment. While by default it can be preferable for a user not to see somebody else's tablet in VR, there can be situations where less than maximum privacy is beneficial—such as for collaboration or education activities. If a user is granted access to another user's VR tablet, the question then becomes what files and information the borrowing user can see and interact with on the other user's tablet—like what if a user is logged into a Google Drive with a variety of folders and files.

In some embodiments, an application being open on another user's tablet, like Google Drive, may be configured so that an unauthorized other user cannot see (such as a black screen or some other hiding feature for Google Drive) that application or access and interact with that application or feature on the user's tablet. In this scenario, the users are looking at the same tablet, but seeing different information. However, it may be that a sharing user wants to permit access to the application/Google Drive on the tablet they are allowing the other user to see and can configure settings in the XR environment to permit such visibility as desired. In this scenario, both users can see the same information on the screen of the tablet and work together on that same tablet.

It will be appreciated that in the real world it is more difficult to control what others see and share between an electronic device screen. The described embodiments in a XR environment, however, allow for detection of the proximity or use of a first user of another second user's VR tablet or other VR screen in the XR environment and use black boxes, hiding features or other blocking mechanisms to control what or what is not seen by the other user. For example, objects, files, and data that are present on a VR tablet subject to privacy mechanisms will be blurred, modified, or otherwise unreadable or unrecognizable to all other users that don't have access. Once given access, the objects, files, and data will return to its original, viewable form. The data from a VR tablet being shared may be encrypted or sent over the network as well.

Shared Tablet by Multiple Users

In some embodiments a group VR tablet, or shared tablet, can be provided for group use and collaboration. Instead of one user assigned to a VR tablet, it could be a number of individuals in a group that all have a shared VR tablet. For example, all 20 children in a class can be authorized to share one group tablet and work together and stand next to each other and use the tablet at the same time, i.e., simultaneously, in a XR environment. In other scenarios, the users could use the same tablet at different times (and the information saved on the VR tablet for later use by any of the other group members in the XR environment) and not only simultaneously.

It will be appreciated that in embodiments, a bigger tablet screen in the XR environment could be provided for a VR group tablet as compared to an individual VR tablet screen size that would generally be smaller than the shared VR tablet screen.

Practicing in Front of Audience

In embodiments, a XR environment can be programmed to allow users to practice or actually give an event activity, such as a performance, speech, presentation and the like to a virtual audience in the place that a user desires to mimic a real-world location (including 3D/360 degrees videos and photographic images of the location). For example, a user in a XR environment could practice or provide a performance singing in the Grand Ole Opry with an audience or defending one's dissertation in a university meeting room with a small audience of evaluators. Or even personal experience might be practiced in the XR environment like a user in XR environment having VR creations of one's parents in a VR representation of a household room and the user is practicing telling the VR parents that they failed a class. In another example, a lawyer or witness could practice in a XR environment in front of a VR judge in a VR courtroom. Adaptable VR-based on events in your calendar or logical progression with school, work and the like can be implemented for practicing activities. Athletes can practice and/or visualize recreations (including 3D/360-degree videos and photographic images) of a stadium, court, field, track, course and/or the like that they will be performing in to gain confidence before the future real-world event.

In certain embodiments, recreations of real-world locations can be provided to a user to immerse themselves or transport to such location as a XR environment that one can explore in 3D. For example, the Roman Coliseum might be described or an image of the arena shown in a history class, and a user can use a control input or other VR command request (such as pushing on or pointing to the image or interacting with text of the Roman Coliseum in the XR environment) and be immersed in/transported to the XR environment of the Roman Coliseum (including from the past or current as desired and chosen by the user).

In embodiments, a database may store a plurality of VR location environments such that different applications and activities can retrieve those location environments for users in the XR environment.

2 People in XR Environment but not in Same Room-Put them Together

In an embodiment of the invention, it is advantageous for persons matching particular characteristics or predefined parameters to be able to interact with one another when the individuals are both in a XR environment but are in different VR locations.

In one embodiment, a first user in a XR environment might be virtually located in a VR library. A second user in the XR environment might be virtually located in a VR research laboratory. A pred-defined matching condition between the first and second users, such as detection that both users are in the same class and are currently interacting with closely-related subject matter can trigger an invitation to each user to join one another in either of the two current VR locations that each is located, or at a third location (such as requested by the users, a blank room or other predefined co-location space that the users can be brought together). If both users accept the invitation, they could be brought together in the co-located location. In some embodiments, the users could be brought together in a teleportation-like mechanism (example would be Star Trek-type "beaming") of one or both users to the same VR location. In further embodiments, a first user might be temporarily brought together with the second user in the second user's VR location with the first user appearing as translucent to the second user when the first user arrives in the second user's VR location and the first user may continue to have two display interfaces in the first user's display headset where the first user's prior location and activities are still accessible, but also the location and activities at the second user's location is temporarily enabled and viewable/capable of interaction.

In some embodiments, the dual location of the first user may appear as a split-type screen (or partial environment splitting) with each 3D environment shown and accessible to the first user, or each location could be "maximized" or "minimized" as selectable by the first user to provide a fully immersive environment of one VR location at a time displayed to the user, but with capability to access and change over to the minimized location (and "maximize" that location while minimizing or closing the other location).

In other embodiments, a user, or multiple users at different VR locations in a XR environment can provide a control input or search request, including via voice command, hand control inputs, user interface selections, controller hardware inputs and the like, to bring such user or users together with others. For example, two users at different locations might simultaneously (or otherwise close in time) search (e.g., voice search or control/text inputs) for a biology quiz study partner on the topic of photosynthesis and based on the pre-programming and monitoring of the VR platform will be brought together, such as by the aforementioned invitation methods, in the same VR location to study together. It will be appreciated, that numerous types of matching conditions, control inputs and activities can be utilized in conjunction with the broader functionality to bring users in different VR locations together into the same VR location for interaction, communication, collaboration and like activities.

2D and 3D Creations—Both Ways

In embodiments, 2D text and drawings can be transformed to 3D visual representations and objects in a XR environment. The first example is text-only moving 2D to 3D and back. Simply put, a 2D word or words can be transformed by user interaction with the XR environment into 3D text (or back to 2D from 3D). Certain gestures, control inputs, voice commands, or other interactions with the XR environment or tools interface (including a VR tablet) cause 2D to 3D and back text transformations.

Another example is molecules. When students are writing chemistry, they're writing in text for a water molecule as $H_2O$. But there is also the molecule's 3D model. A virtual reality molecule generator application or software functionality is provided in the VR platform in which students can build molecules or write formulas/reactions in 2D but then display the same in 3D. From the 2D writing/text a 3D representation is generated based on a database of 3D models and or 3D videos.

In another embodiment, a user in the XR environment might see the VR model of a molecule and initiate an interactive control input with the XR environment to place the molecule in 2D written form such as onto a VR white board or saved as notes in a text file that could be used in XR environment or accessible online in the real world.

In some embodiments, a 3D model of an object or substance, such as of a molecule may have associated notes, descriptions and other media stored in a database as accompanying information for that model. When a user sees the model, grabs it or otherwise interacts with the same, a user of can gain access and see and/or save the notes, description or other media, such as a professor's automatic notes or presentation relating to a molecule (or other modeled object). In some cases, the notes could be displayed to a white board or VR tablet in a VR room. The notes could also be in 2D or 3D.

Another embodiment is using artificial intelligence in combination with a 3D model or other object in VR. So, imagine talking to a molecule, such as a user asking the molecule in the XR environment a question about itself. The molecule (or other object that is subject of the inquisition) may be integrated with AI software so that it answers the questions and/or obtains information related to the interaction. In some instances, a mouth might even appear on the object (e.g., molecule with a mouth).

In other embodiment, 3D graphs may be provided in the 3D environment and even transformed back and forth between 2D and 3D. For example, a 3D graph displayed near a user in the 3D XR environment might be transformed to appear on a 2D plane, like a VR chalkboard or white board by interactive control inputs from a user that request such transformation. The graph might be pulled back off the board/plane to again appear in 3D in the XR environment.

Related, an equation might also appear in 2D, such as on a VR board and corresponding 3D graph then displayed in the XR environment for that equation. A 3D graph might also be "pulled" out of a 2D equation and displayed to a user in the XR environment.

In preferred embodiments, an overarching VR software functionality is provided in the VR platform that allows objects to be coded with object-specific instructions of how the object is transformed between 2D and 3D. In a simple view, each object or type of object would describe to the system how it should be converted from 2D to 3D and from 3D to 2D. A molecule would describe the manner and look of how it should be represented in 2D and how it should be built and represented in 3D. There is no direct database needed in many embodiments, but a database could be used as an intermediate step to gather information about how a particular object should be displayed between 2D and 3D transformations.

In other embodiments, words, such as in a XR environment where a language is being taught, can use 2D to 3D transformation of words and phrases, like a sentence, to better illustrate nouns, verbs, sentence structure and the like. For example, a 2D phrase with word might appear on VR whiteboard while a 3D sentence structure may be displayed as words on blocks (or 3D words) that have different colors based on the type of word (adjective, noun, verb, etc.) so that a user learning the language and sentence construction can see the 3D visual representation (like an adjective modifying a noun) as well as how the sentence is written on a board.

Tutoring Room and Boards

In some embodiments, different VR rooms can be provided for each tutor and student combination for one-on-one tutoring relationships in a XR environment. For example, Tutor and student #1 have a specific VR room (Room #1) that they both enter each week (or each tutor session), and that room (Room #1) remains the same (even if it evolves and changes like with writing on a white board) for that combination of users. For student #2, the Tutor has a different room (Room #2) in XR environments. For each respective student, the Tutors return to that respective room and white board segments remain specific and stay in the respective room for the Tutor and that respective student to come back to. A respective student might also retain access to their tutoring room, and all of their notes and board and other files/information accumulated over the tutoring experience, for perpetuity (for example)—being able to come back weeks, months or years later and revisiting the information (and even the tutoring sessions if recorded so that a respective student can watch replays of a recorded session). In various embodiments, a respective student that retains access to their specific Tutoring room and the related information, files, recordings, documents and like electronic materials can download such materials for use outside of the VR platform, such as for use and review on mobile devices, computers, television-compatible applications and the like.

Tagging, Indexing and Searching Boards as Topics/Subject Matter

Keywords and/or labels can be provided in a XR environment where educational white boards (or even non-educational information boards are used) to index information that is used in different boards. For example, manual or auto-creation (using AI software that recognizes images, text, formulas, graphs, videos, and other types of information to generate a keyword for that information) of keywords can be used to label information locations on different boards.

Through use of keywords, information for different boards and different rooms in VR can be searched and retrieved and the boards and/or media associated with information on the boards for that keyword can be retrieved. A user can search for one word and find all the different boards, and then the user can move to those boards and go back over that material. For example, a student user could come back into their VR educational room without the tutor and search the word "accumulated depreciation" for accounting. The user can see all the problems that they ever had related to accumulated depreciation. And those could be tagged by the tutor or auto-tagged or tagged by the user or manually tagged by other users or organizations. The tutor could bring other students the next semester into those same rooms that have all those boards set up already, and they could jump to different practice problems that are ready to go by using the keywords/labels to search and retrieve the boards and information.

In embodiments, searching for the keywords and the associated information boards and information on the boards can be carried out with speech recognition software and application software that retrieves the boards and information from a database such as stored on a cloud server. The user in a XR environment with information boards could for example speak "Show me all the problems with accumulated depreciation in them" and the retrieval of the associated problems and other corresponding information is provided for access and display to the user.

Tutor Audio and Writing Recordings

For background, there is an app on the iPad called Notability. It has the record feature. So, you can click record audio and/or visual information and then start writing on the iPad, talk, and then you can go back and re-listen or re-watch that at a later point. Notability uses a microphone and a pencil icon In embodiments of the invention, a user can click a record button when you start to write on an information board in the XR environment, and software running in the VR platform syncs the audio with the writing. And then after the recording completed you can press play for the associated recording file, and the user would see the writing on the board or whatever you interacted with show up in real time based on the speech.

In other embodiments other information board and information retrieval action buttons can be provided in VR. Preferably an action button can be provided on a VR information board somewhere next to writing or text (or other information displayed on the board). When a user presses (or similarly activates through a gesture or interaction in VR) the action button and a pre-defined action associated with that button and related to the writing/text will then occur. For example, a video pops up, image is show, audiovisual media is played and the like.

In some instances, an action button can cause a user to re-experience what the user saw before. For example, a user could go back into their own VR body (avatar) at the time of a recording and could see the tutor's body (avatar) at that time when recorded in the XR environment and the user re-experiences that educational event. Preferably a stop button is also provided so that the user can leave the re-experience event when desired. In some embodiments the user does not necessarily enter their own past VR body but could view from a third-party perspective the past experience.

Education/Tutor Pre-Building a Virtual Teaching Room

In embodiments, educators, tutors, employee instructors or other users can set up a room/experience in VR. They are able to go into a room and add content, files, documents, questions, videos, interactive activities and interfaces, electronic materials and the like to the VR room. Subsequently students or other users could enter the room and experience the lesson or tutoring session by going through all of the content and materials that already exist in the room. This scenario is used for asynchronous learning in VR. This teaching room could also be saved and distributed to others to use, including enabling the content and other materials to be shared outside of the XR environment (such as for student or other learner users to download and use on smart devices, mobile devices, television compatible applications, computers, and the like).

3D Video Experiences

In some embodiments, a 3D video experience can be retrieved and presented to a user in a XR environment. Unlike 2D video on a screen or wall, the 3D video is immersive and surrounding the user. A supported 360 degrees video format file is loaded via a webhook or from hard drive. It is then displayed as a "skybox" around the environment. It is then played like a normal video, that is played on the "inside" of a sphere.

For example, a tutor in a XR environment can be able to teleport a user student into a 360 degrees video experience where that user is IN the 360 degrees video. And you can click 'back'. The Mount Everest 3D video in the Quest platform is an example of such video. However, in other VR-environments embodiments of the invention, a user can "jump" from a VR room with an information board into a linked 360 degrees video, where a user can pause and play the associated video linked to the board. A user preferably has his or her palette (i.e., VR tablet with tools so the user can provide control inputs for controlling the 3D video experience) with them to conduct activities in the 360 degrees video. In some instances, a user could draw in the 360 video. In further embodiments, a user can talk to another user from within the 360 degrees video, such as a tutee speaking to a tutor, and then a user can pause video and talk to the other user. In some examples, one or more other users can also be teleported into the same 360 degrees video to interact and/or collaborate. A user can also be provided the functionality to STOP the VR video and RETURN back to the information board room that they were previously in. The VR platform will store in a database the location of when/where the user left the 360 degrees video, such as a timestamp, that reflects when the user left the video so that the user can return and resume the video experience if desired.

In some embodiments, the 360 degrees video can be a lesson for an activity that one user wants to teach to another user. The "teacher" could film in the real world a 360 degrees video with a 3-D camera, such as downhill skiing technique, and the audio and video are recorded for storage and playback in the virtual reality environment. It will be appreciated that the "student' in the XR environment immersed in the lesson video is provided a more detailed and informative learning experience than merely watching a 2D lesson video since the user can look around in all 3-dimensional directions and experience the activity more similarly to the "real world" activity.

Various embodiments of the invention have been described. It will, however, be evident that various modifications and changes may be made thereto, and additional embodiments may be implemented, without departing from the broader scope of the invention as set forth in this disclosure. This specification is to be regarded in an illustrative rather than a restrictive sense.

What is claimed:

1. A system for performing three-dimensional optical character recognition, wherein the system comprises:

a display, memory, and input and output devices, each communicatively coupled to a processor, wherein the processor is configured to:

determine a plane in an extended reality environment;

upon determining the plane, modify a location of one or more pixels representing text such that the one or more pixels are located on the plane in the extended reality environment;

identify, via a three-dimensional optical character recognition algorithm, one or more characters of the text from the one or more pixels in the extended reality environment;

generate interactable text based on the identified one or more characters from the text; and align the interactable text on the plane in the extended reality environment such that the interactable text is a modifiable representation of the text as presented by the one or more pixels.

2. The system of claim 1, wherein the processor is configured to:
- receive one or more commands via an input device, wherein the one or more commands are representative of one or more modifications to one or more characteristics of the interactable text;
- identify the one or more modifications from the one or more commands; and
- modify, based on the one or more modifications, one or more characteristics of the interactable text.

3. The system of claim 2, wherein the one or more characteristics comprise
- size, pitch, yawl, roll, a relative position in the extended virtual reality environment based on the set of coordinates, or any combination thereof; and
- the one or more commands include at least one of a hand movement, analog button input, voice command, and virtual selection via an interactable button in the extended reality environment.

4. The system of claim 1, wherein configuration of the processor to determine the plane is based at least upon a minimized standard deviation.

5. The system of claim 1, wherein the processor is configured to generate an accuracy rating based on a comparison of the text and the interactable text.

6. A method, comprising:
- identifying a set of text from three-dimensional writings in an extended reality environment;
- determining a plane in the extended reality environment based on a set of locations of each text of the set of text, wherein the set of locations comprises a three-dimensional position of each text of the set of text in the extended reality environment;
- upon determining the plane, automatically modify each respective location for each text of the set of text to the determined plane, such that the set of text is aligned with the plane in the extended reality environment and readable by three-dimensional optical character recognition;
- identifying, by the three-dimensional optical character recognition, one or more characters of each text in the extended reality environment;
- generating interactable text based on the identified one or more characters from each text of the set of text; and
- placing the interactable text on the plane such that the interactable text is a modifiable representation of the set of text.

7. The method of claim 6, wherein the set of text comprises one or more words, characters, symbols, or any combination thereof.

8. The method of claim 6, further comprising:
- receiving one or more commands, wherein the one or more commands are representative of one or more modifications to one or more characteristics of the interactable text; and
- modifying, based on the one or more commands, the one or more characteristics of the interactable text, wherein the one or more characteristics comprise size, pitch, yawl, roll, a relative position in the extended virtual reality environment based on the set of coordinates, or any combination thereof.

9. The method of claim 6, further comprising:
- determining misspelled text of the set of text;
- automatically modifying the interactable text associated with misspelled text of the set of text such that the misspelled text is corrected.

10. A method, comprising:
- identifying text from a set of three-dimensional writings in an extended reality environment;
- determining a plane in the extended reality environment based on a set of coordinates of the text, wherein the set of coordinates comprises one or more coordinates representative of a three-dimensional position of the text in the extended reality environment;
- upon determining the plane, automatically modify each respective coordinate of the set of coordinates for the text, such that the text is aligned with the plane in the extended reality environment;
- identifying, by three-dimensional optical character recognition, one or more characters of the text in the extended reality environment;
- generating interactable text based on the identified one or more characters; and
- modifying the one or more coordinates such that the interactable text is disposed on the plane.

11. The method of claim 10, further comprising:
- receiving one or more commands from a user, wherein the one or more commands are representative of one or more modifications to one or more characteristics of the interactable text;
- identifying the one or more modifications from the one or more commands; and
- modifying, based on the one or more modifications, one or more characteristics of the interactable text.

12. The method of claim 11, wherein the one or more characteristics include at least one of size, pitch, yawl, roll, and relative position in the extended virtual reality environment based on the set of coordinates.

13. The method of claim 12, wherein the one or more commands include a hand movement.

14. The method of claim 12, wherein the one or more commands include an analog button input.

15. The method of claim 12, wherein the one or more commands include a voice command.

16. The method of claim 12, wherein the one or more commands include a virtual selection via an interactable button in the extended reality environment.

17. The method of claim 11, wherein the one or more commands include at least one of a hand movement, analog button input, voice command, and virtual selection via an interactable button in the extended reality environment.

18. The method of claim 10, further comprising receiving a command and modifying the interactable text based on the command.

19. The method of claim 18, wherein the command includes a hand movement.

* * * * *